United States Patent
Chang et al.

(10) Patent No.: US 10,782,564 B2
(45) Date of Patent: Sep. 22, 2020

(54) LIQUID CRYSTAL DISPLAY

(71) Applicant: Samsung Display Co., Ltd., Yongin (KR)

(72) Inventors: Hak Sun Chang, Yongin-si (KR); Cheol Shin, Hwaseong-si (KR); Jang Wi Ryu, Seoul (KR); Ki Chul Shin, Seongnam-si (KR); Jae-Soo Jang, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 436 days.

(21) Appl. No.: 14/717,490

(22) Filed: May 20, 2015

(65) Prior Publication Data
US 2016/0097953 A1    Apr. 7, 2016

(30) Foreign Application Priority Data
Oct. 6, 2014    (KR) .................. 10-2014-0134545

(51) Int. Cl.
*G02F 1/1337* (2006.01)
*G02F 1/1343* (2006.01)

(52) U.S. Cl.
CPC .. *G02F 1/133707* (2013.01); *G02F 1/134336* (2013.01); *G02F 2001/134318* (2013.01); *G02F 2001/134345* (2013.01)

(58) Field of Classification Search
USPC ........................................ 349/129, 130, 139
See application file for complete search history.

(56) References Cited

U.S. PATENT DOCUMENTS 6,342,938 B1 *    1/2002    Song ................ G02F 1/133707
                                                            349/129
6,525,794 B1 *    2/2003    Kim ................ G02F 1/133345
                                                            349/129
(Continued)

FOREIGN PATENT DOCUMENTS

CN    102466925    5/2012
JP    2004004315    1/2004
(Continued)

OTHER PUBLICATIONS

Chinese Office Action—Chinese Patent Application No. 201510647191.5 dated Mar. 30, 2020, citing references listed within.

*Primary Examiner* — Edward J Glick
*Assistant Examiner* — David Y Chung
(74) *Attorney, Agent, or Firm* — Cantor Colburn LLP

(57) ABSTRACT

A liquid crystal display includes a lower panel electrode including a lower panel unit electrode, an upper panel electrode including an upper panel unit electrode facing the lower panel unit electrode, and a liquid crystal layer between the lower panel electrode and the upper panel electrode and including liquid crystal molecules, where the lower panel unit electrode includes a center electrode disposed at a center thereof, minute branches which extends from an edge side of the center electrode to an outside, and a first cutout is defined in the center of the center electrode, and the a second cutout is defined in the upper panel unit electrode between the minute branches and the first cutout, and a third cutout is connected to the second cutout and defines a boundary between subregions together with the first cutout.

21 Claims, 24 Drawing Sheets

(56) References Cited

U.S. PATENT DOCUMENTS

| | | | |
|---|---|---|---|
| 6,992,329 B2 | 1/2006 | Wu et al. | |
| 7,227,606 B2 | 6/2007 | Takeda et al. | |
| 7,391,490 B2 * | 6/2008 | Nakanishi | G02F 1/133707 349/129 |
| 7,940,358 B2 | 5/2011 | Jin et al. | |
| 8,330,921 B2 * | 12/2012 | Tsao | G02F 1/133707 349/129 |
| 8,441,604 B2 | 5/2013 | Choi et al. | |
| 8,482,704 B2 | 7/2013 | Jin et al. | |
| 2002/0054265 A1 | 5/2002 | Song et al. | |
| 2006/0044501 A1 | 3/2006 | Mizusako | |
| 2007/0139596 A1 | 6/2007 | Kim et al. | |
| 2011/0037932 A1 * | 2/2011 | Takahashi | G02F 1/133707 349/129 |
| 2012/0281172 A1 * | 11/2012 | Park | G02F 1/133707 349/123 |
| 2013/0107185 A1 * | 5/2013 | Chen | G02F 1/134336 349/142 |
| 2013/0242239 A1 | 9/2013 | Chang et al. | |
| 2013/0250216 A1 * | 9/2013 | Chen | G02F 1/134309 349/96 |
| 2013/0265533 A1 * | 10/2013 | Lim | G02F 1/133707 349/130 |
| 2013/0342777 A1 * | 12/2013 | Jeong | G02F 1/134336 349/38 |
| 2014/0168582 A1 * | 6/2014 | Chang | G02F 1/134309 349/106 |
| 2014/0253859 A1 | 9/2014 | Yoon et al. | |
| 2015/0355511 A1 * | 12/2015 | Shin | G02F 1/134336 349/144 |
| 2016/0033828 A1 * | 2/2016 | Shin | G02F 1/133707 349/139 |
| 2016/0062189 A1 * | 3/2016 | Chang | G02F 1/133707 349/139 |
| 2016/0097955 A1 * | 4/2016 | Kim | G02F 1/133707 349/139 |
| 2016/0097956 A1 * | 4/2016 | Lee | G02F 1/133707 349/139 |

FOREIGN PATENT DOCUMENTS

| | | |
|---|---|---|
| JP | 2004198922 | 7/2004 |
| JP | 201498888 | 5/2014 |

* cited by examiner

LIQUID CRYSTAL DISPLAY

This application claims priority to Korean Patent Application No. 10-2014-0134545 filed on Oct. 6, 2014, and all the benefits accruing therefrom under 35 U.S.C. § 119, the entire contents of which are incorporated herein by reference.

BACKGROUND

(a) Field

The invention relates to a liquid crystal display ("LCD"), and more particularly, to a vertically aligned ("VA") mode LCD which may have improved transmittance.

(b) Description of the Related Art

A liquid crystal display ("LCD") is currently one of the most widely used flat panel displays, and includes two display panels on which electric field generating electrodes such as a pixel electrode and a common electrode are formed, and a liquid crystal layer interposed between the two display panels. The LCD displays an image by generating an electric field on a liquid crystal layer by applying a voltage to the field generating electrodes, determining alignments of liquid crystal molecules of the liquid crystal layer through the generated field, and controlling polarization of incident light.

Among the LCDs, a vertically aligned ("VA") mode LCD, in which liquid crystal molecules are aligned so that long axes thereof are perpendicular to the upper and lower panels while the electric field is not applied, has been in the limelight because its contrast ratio is large and a wide reference viewing angle is easily implemented.

In order to implement a wide viewing angle in such a VA mode LCD, a plurality of domains having different alignment directions of the liquid crystal may be formed in one pixel.

As such, as a means of forming the plurality of domains, a method of forming cutouts such as minute slits on the field generating electrode is used. According to the method, the plurality of domains may be formed by aligning the liquid crystal molecules by a fringe field generated between edges of the cutouts and the field generating electrodes facing the edges thereof.

As examples, LCDs having a domain-forming member include a VA mode LCD having domain-forming members formed at both of the upper and lower substrates, and a patternless VA mode LCD having minute patterns formed only at a lower substrate without forming patterns on an upper substrate. A display area is sectored into a plurality of domains by the domain-forming members, and liquid crystal molecules in each domain are generally inclined in the same direction.

Recently, a method for providing a pretilt to the liquid crystal molecules in the absence of an electric field has been developed to improve response speed of the liquid crystal while providing a wide viewing angle. For the liquid crystal molecules to have the pretilt towards various directions, an alignment layer having various aligning directions may be used, or an alignment aid for providing the pretilt to the liquid crystal molecules of the liquid crystal layer is added to be cured after applying the electric field to the liquid crystal layer. The alignment aid cured by heat or light such as ultraviolet rays may provide the pretilt to the liquid crystal molecules in a predetermined direction. In this instance, to generate the electric field to the liquid crystal layer, the voltage is applied to the respective electric field generating electrodes.

SUMMARY

In order to manufacture a liquid crystal display ("LCD") including an alignment aid for providing a pretilt, the alignment aid and the subsequent curing process using ultraviolet rays are required, thereby resulting in a new processing line for an additional process and an additional cost. Accordingly, the manufacturing cost of the LCD is increased, additional manufacturing equipment is required, and a manufacturing process becomes complicated.

The invention has been made in an effort to provide an LCD capable of being manufactured with a low cost and a simple manufacturing process without additional equipment, and capable of increasing liquid crystal controllability and transmittance.

An exemplary embodiment of the invention provides an LCD including a lower panel electrode including at least one lower panel unit electrode, an upper panel electrode including at least one upper panel unit electrode facing the at least one lower panel unit electrode, and a liquid crystal layer disposed between the lower panel electrode and the upper panel electrode and including a plurality of liquid crystal molecules aligned approximately perpendicular to surfaces of the lower panel electrode and the upper electrode, where the at least one lower panel unit electrode includes a center electrode disposed at the center thereof and a plurality of minute branches extends from an edge side of the center electrode to an outside, a first cutout is defined in the center of the center electrode, a second cutout is defined in the at least one upper panel unit electrode between the minute branches and the first cutout, and a third cutout is connected to the second cutout and provides a boundary between a plurality of subregions together with the first cutout.

In an exemplary embodiment, the first cutout may include a cross-shaped cutout and a central cutout defined in the center of the cross-shaped cutout.

In an exemplary embodiment, the central cutout may be defined to have a polygonal shape including linear sides that are respectively disposed at subregions, and a vertex connected to the cross-shaped cutout.

In an exemplary embodiment, the cross-shaped cutout and the third cutout may extend in the same direction.

In an exemplary embodiment, a distance between the central cutout and the second cutout may be in a range of about 15 micrometers (μm) to about 30 μm.

In an exemplary embodiment, a distance between the second cutout and the minute branches may be in a range of about 15 μm to about 30 μm.

In an exemplary embodiment, the minute branches may extend in different directions at different subregions.

In an exemplary embodiment, the second cutout may be defined to have a polygonal shape including linear cutouts that are respectively disposed at the subregions and a vertex connected to the third cutout.

In an exemplary embodiment, the second cutout may surround the first cutout.

In an exemplary embodiment, the first cutout may include a plurality of first cutouts that are partially overlapped with each other at a vertex of the second cutout.

In an exemplary embodiment, the maximum length of the minute branches may be 30 μm.

In an exemplary embodiment, each of the subregions may include a first section surrounded by the first cutout and the second cutout, a second section surrounded by the second cutout and the minute branches, and a third section provided to include the minute branches.

In an exemplary embodiment, the second cutout may further include a pattern for connecting the first section to the second section.

In an exemplary embodiment, a width of the pattern may be smaller than that of the second cutout.

In an exemplary embodiment, the pattern may include at least one pattern defined in the second cutout that is disposed at each of the subregions.

In an exemplary embodiment, the first cutout may further include a central minute cutout that extends from the cross-shaped cutout and the central cutout.

In an exemplary embodiment, the central minute cutout may extend in different directions at different subregions.

In an exemplary embodiment, one pixel may include first and second subpixels capable of displaying equal or different luminance for one input image signal, each of the first subpixel and the second subpixel may include unit electrodes including the lower panel electrode and the upper electrode, and the number of said at least one unit electrode included in the second subpixel may be equal to or greater than that of said at least one unit electrode included in the first subpixel.

In an exemplary embodiment, the unit electrodes included in the first subpixel and the second subpixel may be provided to have different areas, and the at least one lower panel unit electrode having a large area may include central minute cutouts.

In an exemplary embodiment, the unit electrodes included in the first subpixel and the second subpixel may be provided to have the same area, and each of the lower unit electrodes may include central minute cutouts.

In an exemplary embodiment, the unit electrodes included in the first subpixel and the second subpixel may be provided to have the same area, and each of the lower unit electrodes may not include central minute cutouts.

In an exemplary embodiment, technical objects desired to be achieved in the invention are not limited to the aforementioned objects, and other technical objects not described above will be apparent to those skilled in the art from the invention of the invention.

According to the invention, the following effect may be provided.

According to the exemplary embodiment of the invention, it is possible to manufacture an LCD with a low cost and a simple process without additional manufacturing equipment to increase liquid crystal controllability and transmittance.

The LCD according to the exemplary embodiment of the invention may ameliorate texture generation and luminance reduction by setting the distance between the central cutout and the second cutout and the distance between the second cutout and the minute branches as 15 to 30 μm, and by limiting the maximum length of the minute branches to 30 μm, in order to accomplish sufficient liquid crystal controllability and thus sufficient transmittance.

The LCD according to the exemplary embodiment of the invention may stabilize liquid crystal texture such that the liquid crystal molecules are regularly arranged by including the pattern at each second cutout of the upper panel electrode and securing singular points of the liquid crystal molecules.

The LCD according to the exemplary embodiment of the invention may further improve side visibility by including the central minute cutouts in the at least one lower panel unit electrode according to the area of the subpixel.

In addition to the above-stated effects, other features and advantageous of the invention may be newly determined.

DETAILED DESCRIPTION

Figure 1:
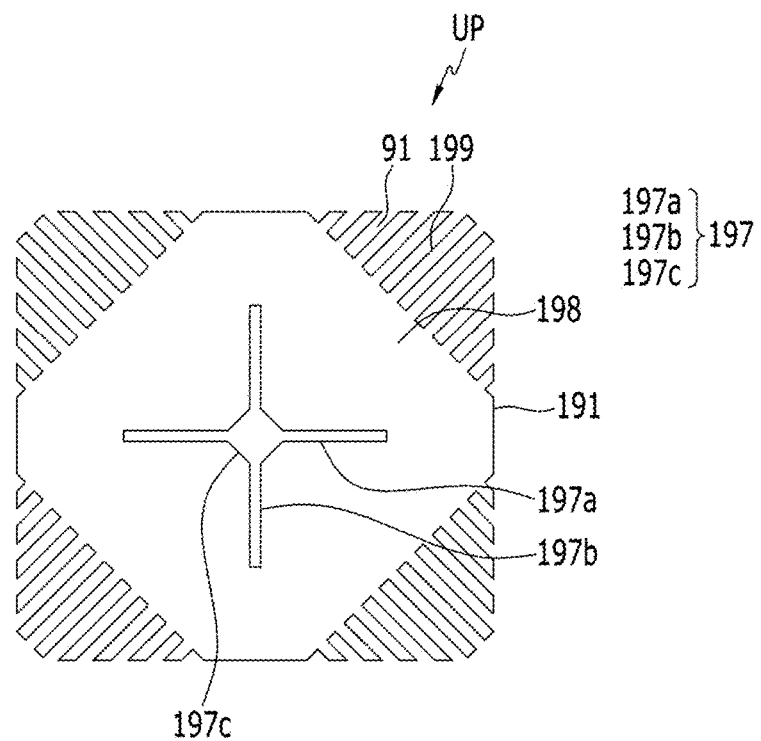
FIG. 1 is a top plan view of an exemplary embodiment of a lower electrode of a liquid crystal display ("LCD") according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

First, a liquid crystal display ("LCD") according to an exemplary embodiment of the invention will be described with reference to FIGS. 1 to 5.

Figure 2:
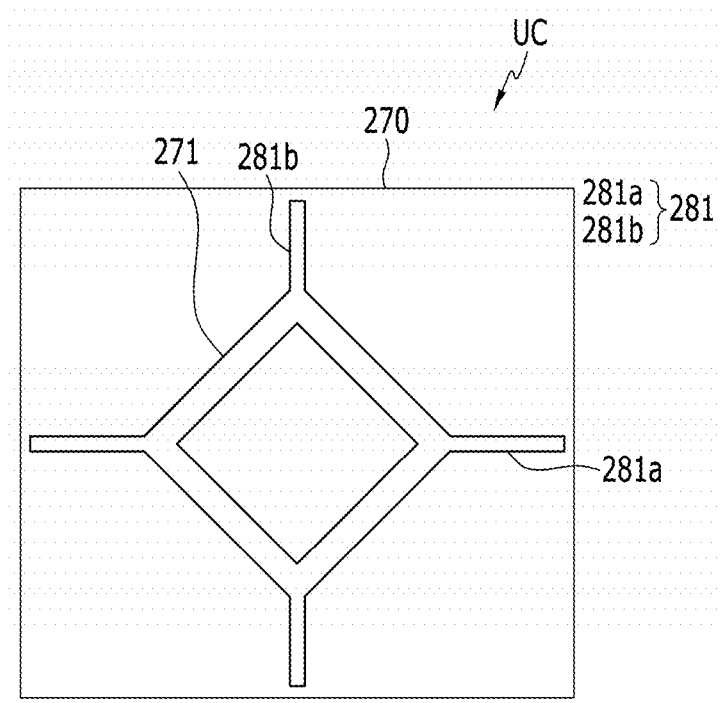
FIG. 2 is a top plan view of an exemplary embodiment of an upper electrode of an LCD according to the invention.
Figure 3:
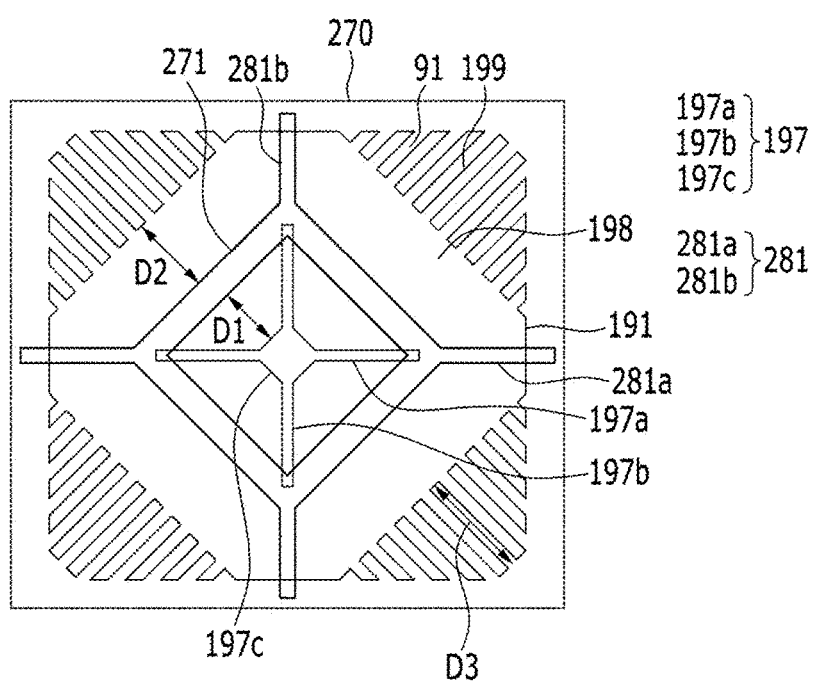
FIG. 3 is a top plan view illustrating the lower electrode of FIG. 1 and the upper electrode of FIG. 2 together.
Figure 4:
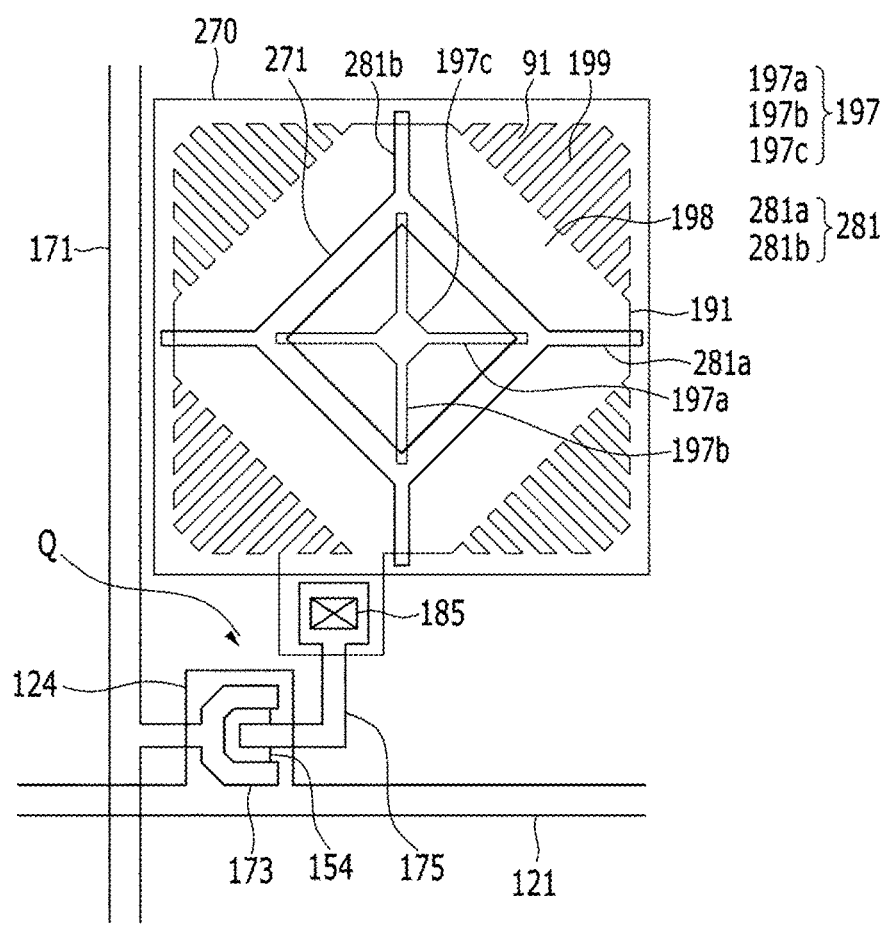
FIG. 4 is a plan view illustrating an exemplary embodiment of one pixel of an LCD according to the invention.
Figure 5:
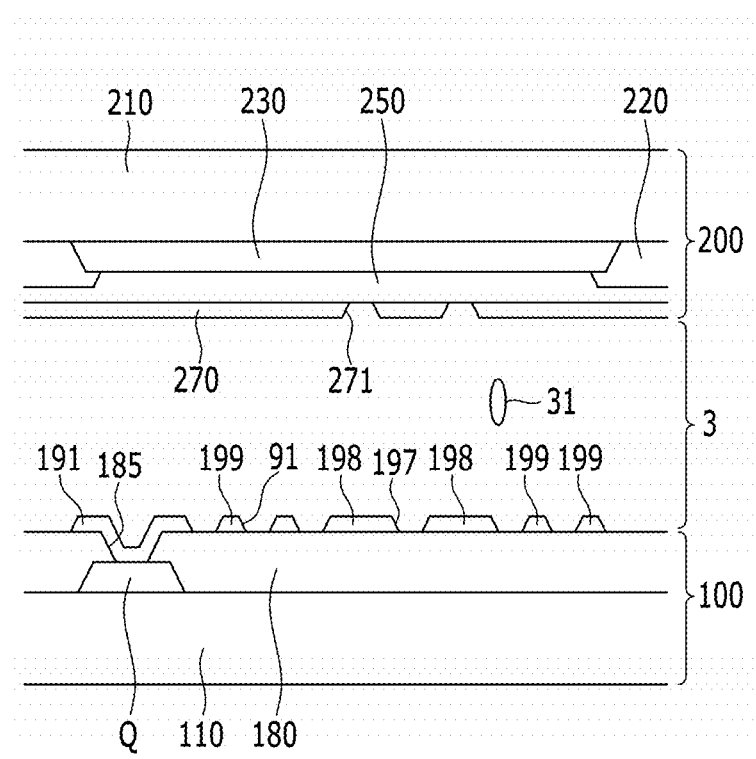
FIG. 5 is a cross-sectional view of the LCD of FIG. 4.

FIG. 1 is a top plan view of a lower electrode of an LCD according to an exemplary embodiment of the invention, FIG. 2 is a top plan view of an upper electrode of an LCD according to an exemplary embodiment of the invention, FIG. 3 is a top plan view illustrating the lower electrode of FIG. 1 and the upper electrode of FIG. 2 together, FIG. 4 is a plan view illustrating one pixel of an LCD according to an exemplary embodiment of the invention, and FIG. 5 is a cross-sectional view of the LCD of FIG. 4.

Referring to FIGS. 4 and 5, an LCD according to an exemplary embodiment of the invention includes a lower panel 100 and an upper panel 200 facing each other, and a liquid crystal layer 3 interposed between the two display panels 100 and 200.

Firstly, referring to the lower panel 100, a gate line 121 including a gate electrode 124 is disposed on an insulation substrate 110. The gate line 121 transmits a gate signal and mainly extends in the transverse direction.

A gate insulating layer (not shown) is disposed on the gate line 121, and a semiconductor 154 including hydrogenated amorphous silicon, polysilicon, or an oxide semiconductor is positioned on the gate insulating layer.

A data line 171 and a drain electrode 175 are disposed on the semiconductor 154 and the gate insulating layer.

The data line 171 transmits data voltages and extends in the longitudinal direction thereby intersecting the gate line 121. The data line 171 includes a source electrode 173 extending toward the gate electrode 124.

The drain electrode 175 is separated from the data line 171 and includes a portion facing the source electrode 173.

The gate electrode 124, the source electrode 173, and the drain electrode 175 provide a thin film transistor ("TFT") Q along with the semiconductor 154.

A passivation layer 180 is positioned on the TFT Q. A contact hole 185 exposing the drain electrode 175 is defined in the passivation layer 180.

A lower electrode 191 is disposed on the passivation layer 180. The lower electrode 191 may include a transparent conductive material such as indium tin oxide ("ITO") or indium zinc oxide ("IZO"), or a reflective metal such as aluminum, silver, chromium, or an alloy thereof. The lower electrode 191 may receive the data voltage through the TFT Q controlled by the gate signal.

Referring to FIG. 1, the entire shape of the lower electrode 191 positioned at one pixel PX is quadrangular, and the lower electrode 191 includes a center electrode 198 disposed at the center thereof, a first cutout 197 defined in the center of the center electrode 198, and a plurality of minute branches 199 disposed to extend from an edge side of the center electrode 198 to the outside.

The center electrode 198 is provided as a partially whole plate, and the first cutout 197 is defined in the center of the center electrode 198.

The first cutout 197 includes cross-shaped cutouts 197a and 197b, and a central cutout 197c defined in the center of the cross-shaped cutouts 197a and 197b. The cross-shaped cutouts 197a and 197b include a horizontal cutout 197a that extends substantially in parallel with the gate line 121, and a vertical cutout 197b that extends substantially in parallel with the data line 171.

In this case, the lower electrode 191 of one pixel PX may be divided into four subregions by the cross-shaped cutouts 197a and 197b and a third cutout 281 (refer to FIG. 2), which will be further described later.

The central cutout 197c may be defined in a region at which the horizontal cutout 197a and the vertical cutout 197b cross each other to have a polygonal shape (e.g., a rhombic shape) including four linear sides positioned at the four subregions. A vertex of the central cutout 197c is connected to the horizontal cutout 197a and the vertical cutout 197b.

The minute branches 199 are disposed to extend from an edge side of the center electrode 198 to a corner of the lower electrode 191. A minute slit 91 at which an electrode is removed is defined between adjacent minute branches 199. Specifically, a plurality of minute slits 91 are defined in four corners of the center electrode 198, and the minute branches 199 are provided by the minute slits 91.

In other words, the minute branches 199 are disposed at corners of the four subregions that are divided by the cross-shaped cutouts 197a and 197b, and the minute branches 199 disposed at each of the subregions are extended in different directions.

Specifically, the minute branches 199 of one subregion disposed at the upper left side among the four subregions are obliquely extended from the center electrode 198 of the lower electrode 191 in the upper left direction, the minute branches 199 of one subregion disposed at the upper right side are obliquely extended from the center electrode 198 of the lower electrode 191 in the upper right direction, the minute branches 199 of one subregion disposed at the lower left side are obliquely extended from the center electrode 198 of the lower electrode 191 in the lower left direction, and the minute branches 199 of one subregion disposed at the lower right side are obliquely extended from the center electrode 198 of the lower electrode 191 in the lower right direction.

End portions of at least some of the minute branches 199 are connected to each other through linear connections (not shown). In an exemplary embodiment, at least one of the end portions of the minute branches 199 disposed at an upper end, a lower end, a left end, and a right end of the lower electrode 191 may be connected to each other to provide an external frame of the lower electrode 191.

The lower electrode 191 shown in FIG. 1 may provide a lower unit electrode UP serving as a unit of a lower electrode according to various exemplary embodiments to be further described later.

Referring back to FIG. 5, in the upper panel 200, a color filter 230 and a light blocking member 220 may be disposed on an insulation substrate 210. The light blocking member 220 which is also referred to as a black matrix may prevent occurrence of light leakage between the upper panel 200 and the lower electrode 191. The color filter 230 may display any one of primary colors, such as three primary colors of red, green, and blue.

Unlike those illustrated in FIG. 5, at least one of the light blocking member 220 and the color filter 230 may be disposed on the lower panel 100.

An overcoat 250 is positioned on the color filter 230 and the light blocking member 220, and an upper electrode 270 is positioned on the overcoat 250. The upper electrode 270 may include a transparent conductor or a metal such as ITO and IZO. The upper electrode 270 may receive a common voltage.

Referring to FIG. 2, a second cutout 271 having a substantially rhombic shape and the third cutout 281 connected to the second cutout 271 are defined in the upper electrode 270 disposed at one pixel PX.

The second cutout 271 includes four linear cutouts that are respectively defined in four subregions, and a vertex disposed on the third cutout 281 in which the four linear cutouts are defined.

The third cutout 281 includes a connecting horizontal cutout 281a that extends substantially in parallel with the gate line 121, and a connecting vertical cutout 281b that extends substantially in parallel with the data line 171. The connecting horizontal cutout 281a is defined to extend in the same direction as that of the horizontal cutout 197a of the lower electrode 191, and the connecting vertical cutout 281b is defined to extend in the same direction as that of the vertical cutout 197b of the lower electrode 191.

As described above, the upper electrode 270 may be divided into four subregions by the third cutout 281 and the cross-shaped cutouts 197a and 197b of the lower electrode 191.

The upper electrode 270 shown in FIG. 2 may provide an upper unit electrode UC serving as a unit of an upper electrode according to various exemplary embodiments to be further described later.

Referring to FIGS. 1 to 3, the second cutout 271 of the upper electrode 270 is defined between the minute branches 199 of the lower electrode 191 and the first cutout 197 of the lower electrode 191 while being overlapped with the center electrode 198 of the lower electrode 191. In other words, the second cutout 271 is provided to have a rhombic shape that is larger than that of the central cutout 197c of the lower electrode 191, to surround the first cutout 197 of the lower electrode 191.

The vertical cutout 197b of the lower electrode 191 and the second cutout 271 of the upper electrode 270 are provided to partially overlap each other. Specifically, an end portion of the vertical cutout 197b of the lower electrode 191 is provided to overlap the vertex of the second cutout 271 of the upper electrode 270. In this case, the horizontal cutout 197a of the lower electrode 191 and the connecting horizontal cutout 281a of the upper electrode 270 are disposed to extend in the same direction, and the lower electrode 191 of the vertical cutout 197b and the connecting vertical cutout 281b of the upper electrode 270 are provided to extend in the same direction.

The unit electrode constituted by the lower electrode 191 and the upper electrode 270 may be divided into a plurality of subregions by the cross-shaped cutouts 197a and 197b of the lower electrode 191 and the third cutout 281 of the upper electrode 270.

Each of the subregions includes a first section surrounded by the first cutout 197 of the lower electrode 191 and the second cutout 271 of the upper electrode 270, a second section surrounded by the second cutout 217 of the upper electrode 270 and the minute branches 199 of the lower electrode 191, and a third section provided to include the minute branches 199 of the lower electrode 191.

In this case, a distance D1 of the first section may be in a range of about 15 micrometers ($\mu$m) to about 30 $\mu$m. In other words, the distance D1 between the central cutout 197c and the second cutout 271 may be in a range of about 15 $\mu$m to about 30 $\mu$m. Further, the distance D2 of the second section may also be in a range of about 15 $\mu$m to about 30 $\mu$m. In other words, the distance D2 between the second cutout 271 and the minute branches 199 may be in a range of about 15 $\mu$m to about 30 $\mu$m. However, the distance D1 of the first section and the distance D2 of the second section may be varied according to the pixel size without being limited thereto. The distance D3 of the third section may be in range of about 30 $\mu$m at maximum. In other words, the maximum length of the minute branches 199 may be about 30 $\mu$m, but is not limited thereto. When the pitches of the minute branches 199 and the minute slits 91 are changed, the maximum of the minute branches 199 may be changed.

An acute angle between the minute branches 199 and the horizontal cutout 197a may be in a range of about 40 degrees (°) to about 45°, but may be appropriately adjusted in consideration of a display characteristic such as visibility of the LCD.

Referring back to FIG. 5, the liquid crystal layer 3 disposed between the display panels 100 and 200 includes liquid crystal molecules 31 having negative dielectric anisotropy. The liquid crystal molecules 31 are arranged such that a longitudinal axis thereof may be perpendicular to the surfaces of the two display panels 100 and 200 in the absence of an electric field. The alignment of the liquid crystal molecules 31 of one pixel PX may be divided according to the position of the sub-region, and may not have the pretilt in the length direction of the minute branch 199 with respect to the surface of the display panels 100 and 200. That is, it is not necessary for the liquid crystal layer 3 or alignment layers (not shown) to include a cured alignment aid to provide the pretilt to the liquid crystal molecules 31, unlike in a conventional art.

A polarizer (not shown) is disposed on an external surface of at least one of the two display panels 100 and 200. Polarization axes of two polarizers may be perpendicular to each other, and one of the polarization axes may be substantially parallel with the gate line 121.

Next, a driving method of the LCD according to an exemplary embodiment of the invention will be described with reference to FIGS. 6A and 6B as well as FIGS. 1 to 5.

Figure 6A:
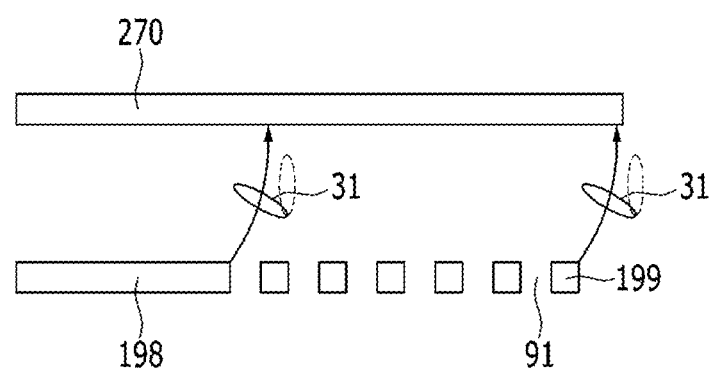
FIGS. 6A and 6B illustrate an exemplary embodiment of fringe fields generated by a lower electrode and an upper electrode of an LCD according to the invention.
Figure 6B:
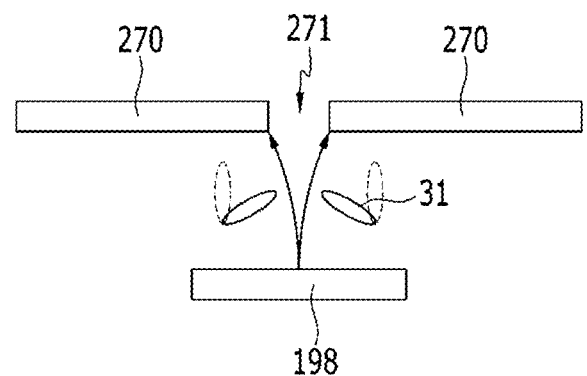

FIGS. 6A and 6B illustrate fringe fields generated by a lower electrode and an upper electrode of an LCD according to an exemplary embodiment of the invention.

When a gate-on voltage is applied to the gate electrode 124 of the TFT Q to turn on the TFT Q, the data voltage is applied to the lower electrode 191. The lower electrode 191 applied with the data voltage and the upper electrode 270 applied with the common voltage together generate the electric field to the liquid crystal layer 3.

The electric field includes a vertical component of a direction approximately perpendicular to the surfaces of the display panels 100 and 200, and the liquid crystal molecules 31 tend to be inclined in the direction approximately parallel to the surfaces of the display panels 100 and 200 by the vertical component of the electric field. Referring to FIGS. 6A and 6B, the edge of the minute branches 199 of the lower electrode 191, the center electrode 198 of the lower electrode 191, and the second cutout 271 of the upper electrode 270 generate the fringe field. Specifically, referring to FIG. 6A, the liquid crystal molecules 31 positioned near the edge of the minute branches 199 and the edge of the center electrode 198 are inclined toward the inside of the center electrode 198 and the minute branches 199 of the lower electrode 191 by the fringe field. Referring to FIG. 6B, the liquid crystal molecules 31 positioned near the edge of the second cutout 271 of the upper electrode 270 are inclined toward the inside of the second cutout 271 by the fringe field.

As a result, the liquid crystal molecules 31 are mostly inclined toward the center portion of the second cutout 271 in the direction approximately parallel to the minute branches 199. Accordingly, the inclination directions (also referred to as an arrangement direction) of the liquid crystal molecules 31 are different with respect to the second cutout 271 of the upper electrode 270.

Figure 7:
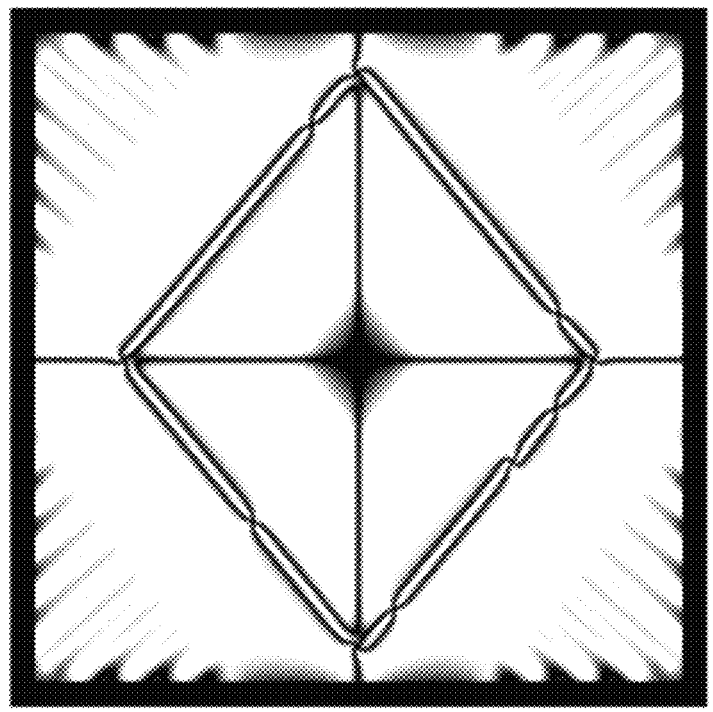
FIGS. 7 and 8 are simulation result images of an exemplary embodiment of an LCD according to the invention.
Figure 8:
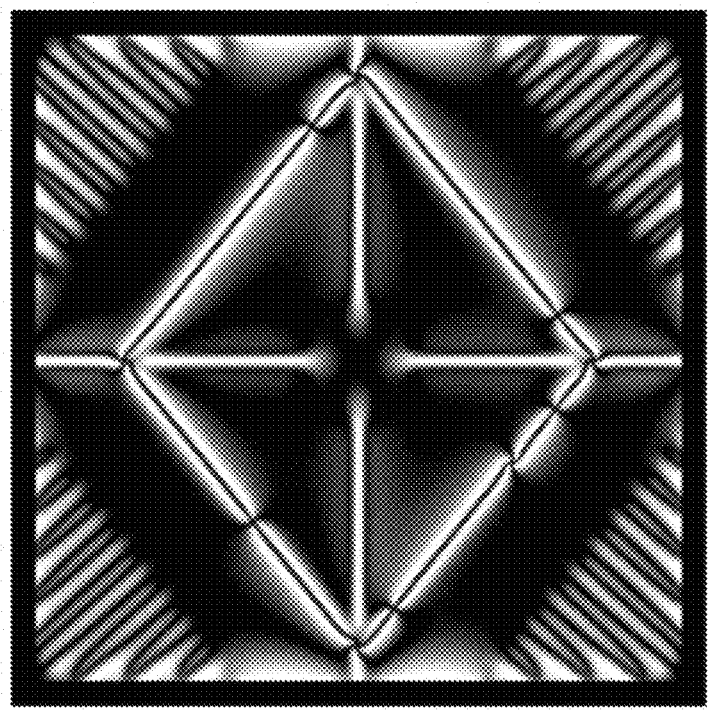

FIGS. 7 and 8 are simulation result images of an LCD according to an exemplary embodiment of the invention, illustrating one pixel to which a voltage is applied in the LCD shown in FIG. 3.

FIG. 7 is an initial behavior image of liquid crystal modules when a relative high voltage is applied to a unit electrode of the LCD according to the exemplary embodiment, and FIG. 8 is an initial behavior image of liquid crystal modules when a relative low voltage is applied to the unit electrode of the LCD according to the exemplary embodiment.

Referring to FIGS. 7 and 8 as well as FIG. 3, the LCD of the exemplary embodiment may include the cross-shaped cutouts 197a and 197b at the center of the lower electrode 191, the minute branches 199 at an edge of the lower electrode 191, and the second cutout 271 for distinguishing the minute branches 199 and the cross-shaped cutouts 197a and 197b, to provide a pretilt to the liquid crystal molecules 31. Accordingly, it is possible to control the liquid crystal molecules without providing a conventional alignment aid for increasing the response speed at the liquid crystal layer 3 and reduce an area occupied by the minute branches 199, thereby improving the transmittance.

Further, as described above, the LCD according to the exemplary embodiment may ameliorate texture generation and luminance reduction by setting the distance between the central cutout 197c and the second cutout 271 and the distance between the second cutout 271 and the minute branches 199 as about 15 µm to about 30 µm and by limiting the maximum length of the minute branches to about 30 µm, in order to accomplish sufficient liquid crystal controllability and thus sufficient transmittance. However, when the pitches of the minute branches 199 and the minute slits 91 or other design conditions are changed, the maximum length of the minute branches 199 for optimizing the transmittance may be changed.

In order to accomplish sufficient liquid crystal controllability of the liquid crystal molecules 31 to suppress transmittance reduction for one pixel PX, when the size of the pixel PX is increased, the pixel PX may include a plurality of lower unit electrodes UP and upper unit electrodes UC described above. This will be further described later.

As such, the LCD according to the embodiment does not require an additional process such as a curing process of an alignment aid for providing the pretilt. Accordingly, it is possible to reduce manufacturing cost of the LCD and simplify the manufacturing process.

Figure 9:
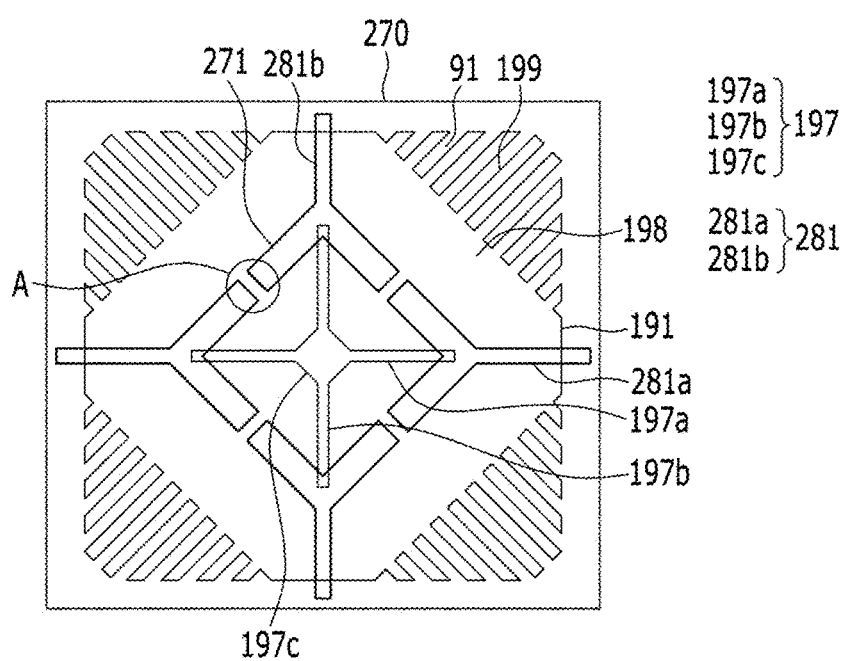
FIG. 9 is a top plan view of an exemplary embodiment of a unit electrode of an LCD according to the invention.
Figure 10:
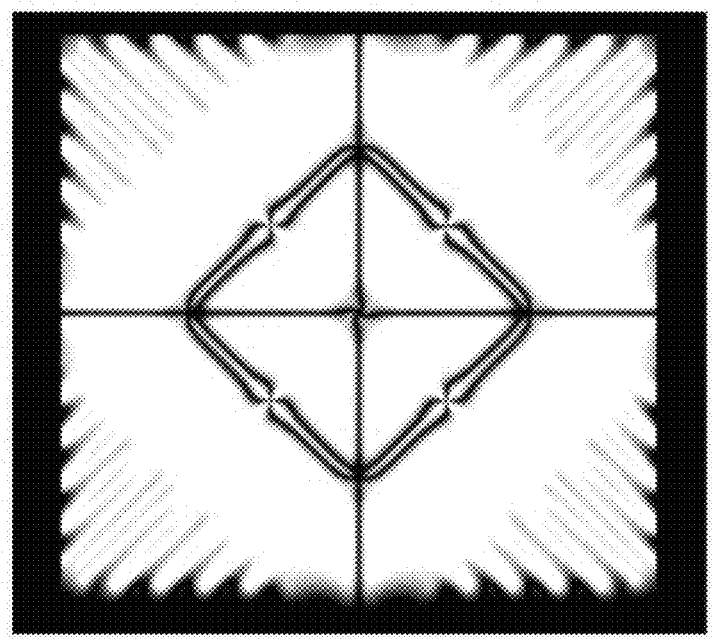
FIG. 10 is a simulation result image of an exemplary embodiment of an LCD according to the invention.

FIG. 9 is a top plan view of a unit electrode of an LCD according to an exemplary embodiment of the invention, and FIG. 10 is a simulation result image of an LCD according to an exemplary embodiment of the invention, illustrating one pixel to which a voltage is applied in the LCD shown in FIG. 9. The same constituent elements as in the exemplary embodiments described above are designated by the same reference numerals, and the duplicated description may be omitted.

Referring to FIGS. 9 and 10, the upper electrode 270 according to the exemplary embodiment is mostly the same as the upper electrode 270 according to the aforementioned exemplary embodiment, but the upper electrode 270 according to the exemplary embodiment further includes a pattern A in the second cutout 271.

The second cutout 271 may be defined to have a polygonal shape, e.g., a rhombic shape, including linear cutouts that are respectively disposed at the subregions, and at least one pattern A may be defined in each linear cutout of the second cutout 271.

The pattern A serves to connect the first section surrounded by the first cutout 197 and the second cutout 271 to the second section surrounded by the second cutout 271 and the minute branches 199. In other words, the second cutout 271 serves to separate the first section and the second section from each other, and the pattern A of the second cutout 271 may stabilize liquid crystal texture such that the liquid crystal molecules are regularly arranged by securing singular points of the liquid crystal molecules. In this case, a width of the pattern A may be smaller than that of the second cutout 271. When the width of the pattern A is equal to or larger than that of the second cutout 271, the pattern A may not function as a singular point.

As such, the LCD according to the exemplary embodiment may stabilize liquid crystal texture such that the liquid crystal molecules are regularly arranged by defining the pattern A at each second cutout 271 of the upper electrode 270 and securing singular points of the liquid crystal molecules.

Figure 11:
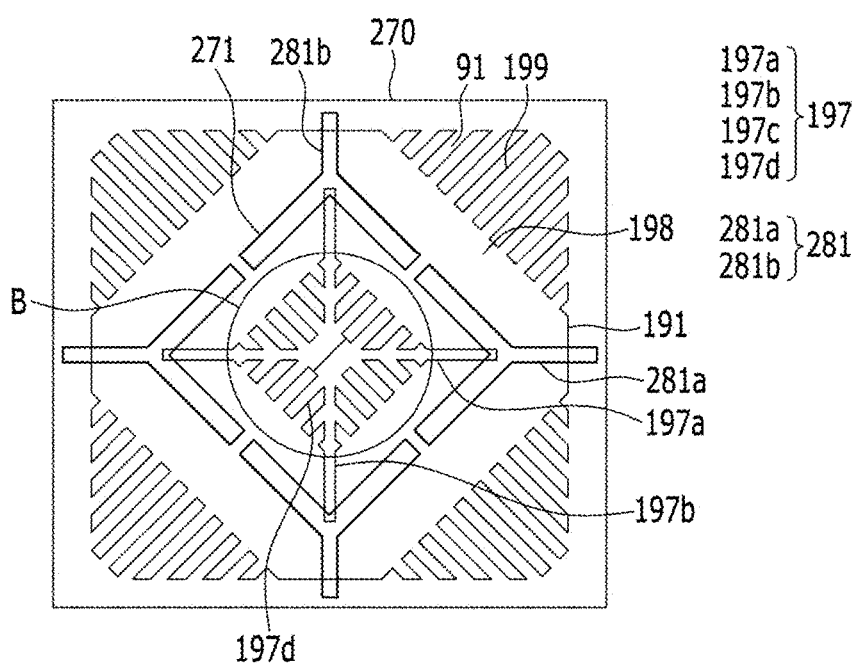
FIG. 11 is a top plan view of a unit electrode of an exemplary embodiment of an LCD according to the invention.

FIG. 11 is a top plan view of a unit electrode of an LCD according to an exemplary embodiment of the invention. The same constituent elements as in the exemplary embodiments described above are designated by the same reference numerals, and the duplicated description may be omitted.

Referring to FIG. 11, the lower electrode 191 according to the exemplary embodiment is mostly the same as the lower electrode 191 according to the aforementioned exemplary embodiment, but central minute cutouts 197d at the first cutout 197 are defined in the lower electrode 191.

The central minute cutouts 197d are defined to extend from the cross-shaped cutouts 197a and 197b and the central cutout 197c at the first section B.

Specifically, the central minute cutouts 197d may be defined to entirely have a rhombic shape that is the same as that of the second cutout 271 while extending from the cross-shaped cutouts 197a and 197b and the central cutout 197c.

Further, the central minute cutouts 197d are disposed to extend in different directions at different subregions. Specifically, the central minute cutouts 197d of one subregion disposed at an upper left side among the four subregions of the lower electrode 191 are obliquely extended from the cross-shaped cutouts 197a and 197b and the central cutout 197c in an upper left direction, the central minute cutouts 197d of one subregion disposed at an upper right side are obliquely extended from the cross-shaped cutouts 197a and 197b and the central cutout 197c in an upper right direction, the central minute cutouts 197d of one subregion disposed at a lower left side are obliquely extended from the cross-shaped cutouts 197a and 197b and the central cutout 197c in a lower left direction, and the central minute cutouts 197d of one subregion disposed at a lower right side are obliquely extended from the cross-shaped cutouts 197a and 197b and the central cutout 197c in a lower right direction.

As such, the central minute cutouts 197d at the first cutout 197 of the lower electrode 191 of the LCD according to the exemplary embodiment may be defined to improve liquid crystal controllability when the size of one pixel PX is increased.

Figure 12:
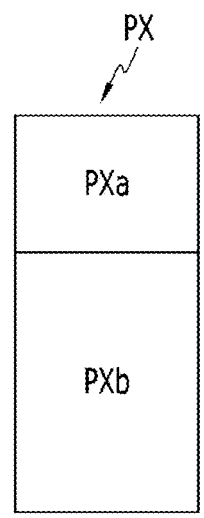
FIG. 12 illustrates an exemplary embodiment of two subpixels included in one pixel of an LCD according to the invention.

FIG. 12 illustrates two subpixels included in one pixel of an LCD according to an exemplary embodiment of the invention.

Referring to FIG. 12, one pixel PX of an LCD according to an exemplary embodiment of the invention may include a first subpixel PXa and a second subpixel PXb. The first subpixel PXa and the second subpixel PXb may also display images according to different gamma curves and display images depending on the same gamma curve, for one input image signal. That is, the first subpixel PXa and the second subpixel PXb of one pixel PX may display images having different luminance to improve side visibility for the one input image signal. Areas of the first subpixel PXa and the second subpixel PXb may be the same as or different from each other.

As such, the pixel PX including the first subpixel PXa and the second subpixel PXb may have various circuit structures and dispositions to display the images having different luminance.

Figure 13:
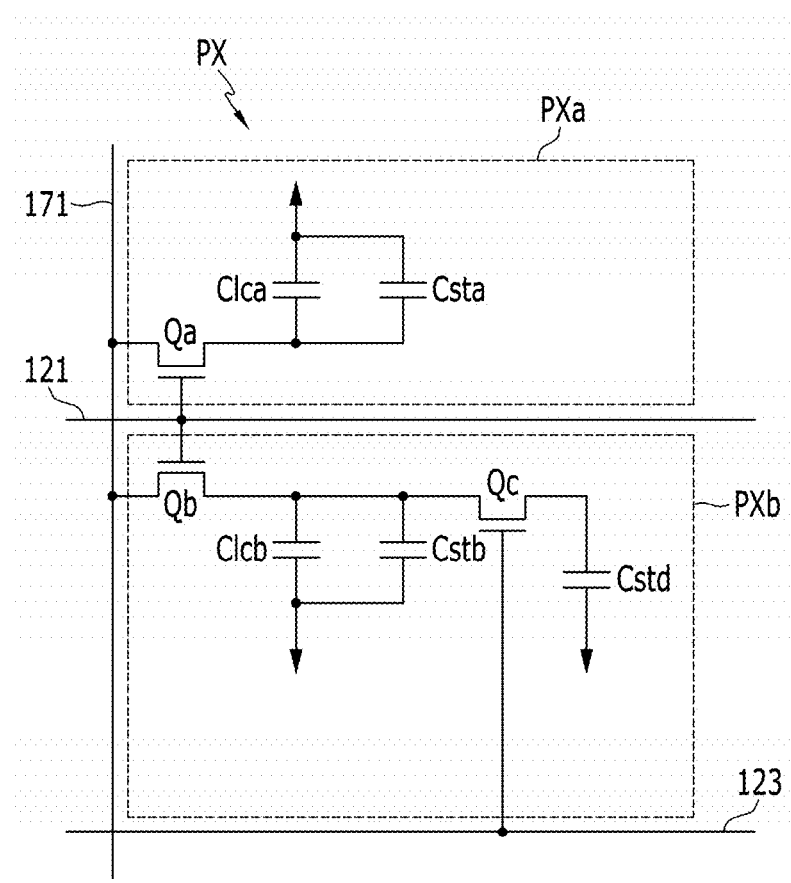
FIG. 13 is an exemplary embodiment of an equivalent circuit diagram of one pixel of an LCD according to the invention.

FIG. 13 is an equivalent circuit diagram of one pixel of an LCD according to an exemplary embodiment of the invention.

Referring to FIG. 13, the LCD according to the exemplary embodiment of the invention includes signal lines including a gate line 121, a step-down gate line 123, and a data line 171, and a pixel PX connected to the signal lines.

Each pixel includes first and second subpixels PXa and PXb. The first subpixel PXa includes a first switching element Qa, a first liquid crystal capacitor Clca, and a first storage capacitor Csta, and the second subpixel PXb includes second and third switching elements Qb and Qc, a second liquid crystal capacitor Clcb, a second storage capacitor Cstb, and a step-down capacitor Cstd.

The first and second switching elements Qa and Qb are respectively connected to the gate line 121 and the data line 171, and the third switching element Qc is connected to the step-down gate line 123.

In an exemplary embodiment, the switching elements Qa and Qb may be three-terminal elements such as TFTs, and control terminals thereof are connected to the gate lines 121, input terminals thereof are connected to the data lines 171, and output terminals thereof are respectively connected to the first and second liquid crystal capacitors Clca and Clcb and the first and second storage capacitors Csta and Cstb.

The third switching element Qc is also a three-terminal element of a TFT, and a control terminal thereof is connected to the step-down gate line 123, an input terminal thereof is connected to the second liquid crystal capacitor Clcb, and an output terminal thereof is connected to the step-down capacitor Cstd.

The step-down capacitor Cstd is connected to the output terminal of the third switching element Qc and a common voltage.

An operation of the pixel PX will now be described. First, a gate-on voltage is applied to the gate line 121, and the first and second switching elements Qa and Qb connected thereto are turned on. Accordingly, the data voltage of the data line 171 is applied to the first and second liquid crystal capacitors Clca and Clcb through the turned-on first and second switching elements Qa and Qb such that the first and second liquid crystal capacitors Clca and Clcb are charged with a difference between the data voltage and the common voltage. In this instance, the step-down gate line 123 is applied with a gate-off voltage.

Next, when the gate off voltage is applied to the gate line 121 and the gate-on voltage is applied to the step-down gate line 123, the first and second switching elements Qa and Qb are turned off, and the third switching element Qc is turned on. As a result, a charging voltage of the second liquid crystal capacitor Clcb connected with the output terminal of the second TFT Qb is reduced. Accordingly, in the case of the LCD driven by frame inversion, the charging voltage of the second liquid crystal capacitor Clcb may always be lower than a charging voltage of the first liquid crystal capacitor Clca. Accordingly, visibility of the LCD may be improved by differentiating the charge voltages of the first and second liquid crystal capacitors Clca and Clcb.

Figure 14:
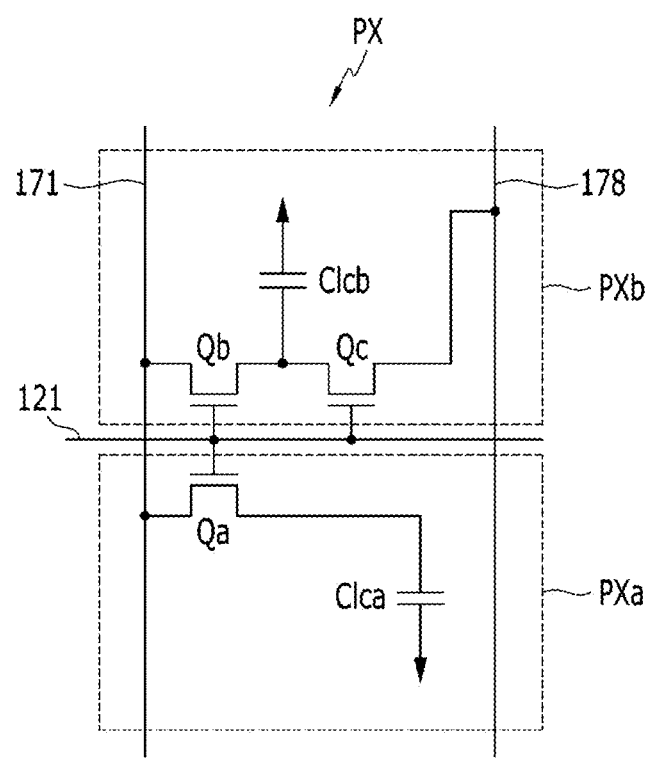
FIG. 14 is an exemplary embodiment of an equivalent circuit diagram of one pixel of an LCD according to the invention.

FIG. 14 is an equivalent circuit diagram of one pixel of an LCD according to an exemplary embodiment of the invention.

Referring first to FIG. 14, the LCD according to the exemplary embodiment of the invention includes the signal line which includes the gate line 121, the data line 171, a reference voltage line 178 transferring a reference voltage, and the like, and the pixel PX connected thereto.

Each pixel includes first and second subpixels PXa and PXb. The first subpixel PXa includes the first switching element Qa and the first liquid crystal capacitor Clca, and the second subpixel PXb includes the second and third switching elements Qb and Qc and the second liquid crystal capacitor Clcb.

The first and second switching elements Qa and Qb are each connected to the gate line 121 and the data line 171, and the third switching element Qc is connected to the output terminal of the second switching element Qb and the reference voltage line 178.

The output terminal of the first switching element Qa is connected to the first liquid crystal capacitor Clca, and the output terminal of the second switching element Qb is connected to the second input liquid crystal capacitor Clcb and the input terminal of the third switching element Qc. The control terminal of the third switching element Qc is connected to the gate line 121, the input terminal thereof is connected to the second liquid crystal capacitor Clcb, and the output terminal thereof is connected to the reference voltage line 178.

An operation of the pixel PX shown in FIG. 14 will now be described. First, a gate-on voltage is applied to the gate line 121, and the first, second, and third switching elements Qa, Qb, and Qc connected thereto are turned on. Accordingly, the data voltage applied to the data line 171 is applied to the first liquid crystal capacitor Clca and the second liquid crystal capacitor Clcb, respectively, through the first switching element Qa and the second switching element Qb which are turned on, such that the first liquid crystal capacitor Clca and the second liquid crystal capacitor Clcb are charged as much as a difference between the data voltage and the common voltage. In this case, the same data voltage is transferred to the first liquid crystal capacitor Clca and the second liquid crystal capacitor Clcb through the first and second switching elements Qa and Qb, but the charging voltage of the second liquid crystal capacitor Clcb is divided through the third switching element Qc. As a result, the charging voltage of the second liquid crystal capacitor Clcb is smaller than that of the first liquid crystal capacitor Clca, such that the luminance of the two subpixels PXa and Pxb may be different. Accordingly, when the voltage charged in the first liquid crystal capacitor Clca and the voltage charged in the second liquid crystal capacitor Clcb are appropriately controlled, the image viewed from a side may maximally approach the image viewed from the front, thereby improving the side visibility.

Figure 15:
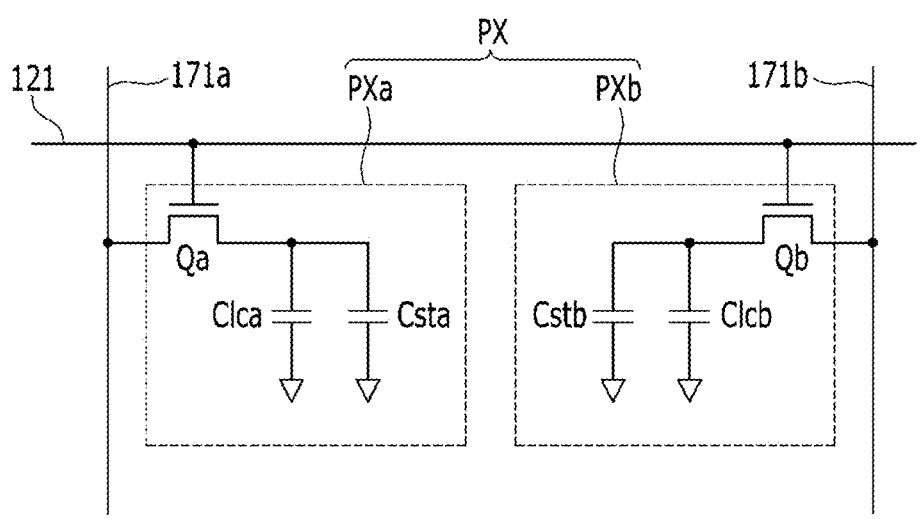
FIGS. 15, 16, and 17 are respective exemplary embodiments of equivalent circuit diagrams of one pixel of an LCD according to the invention.
Figure 16:
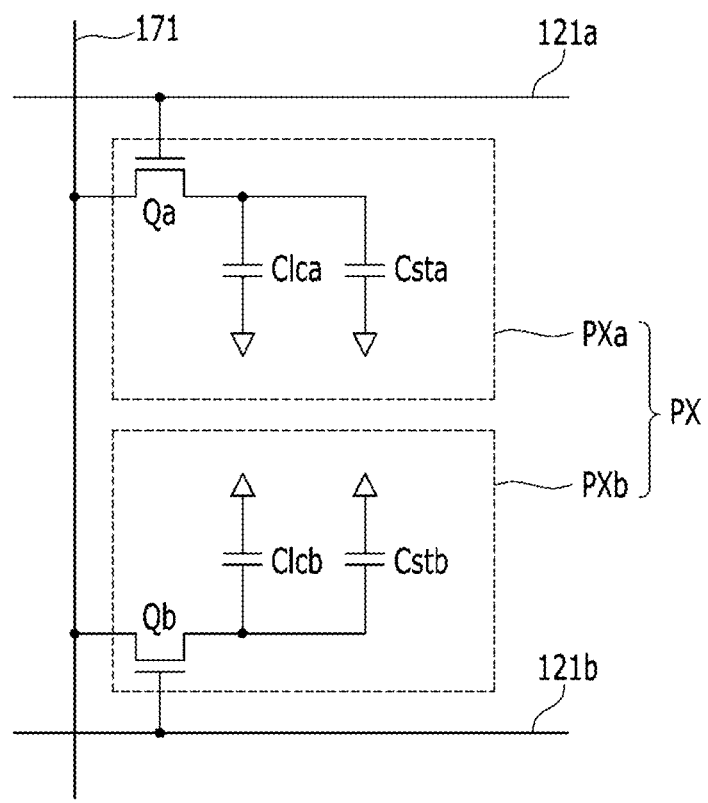
Figure 17:
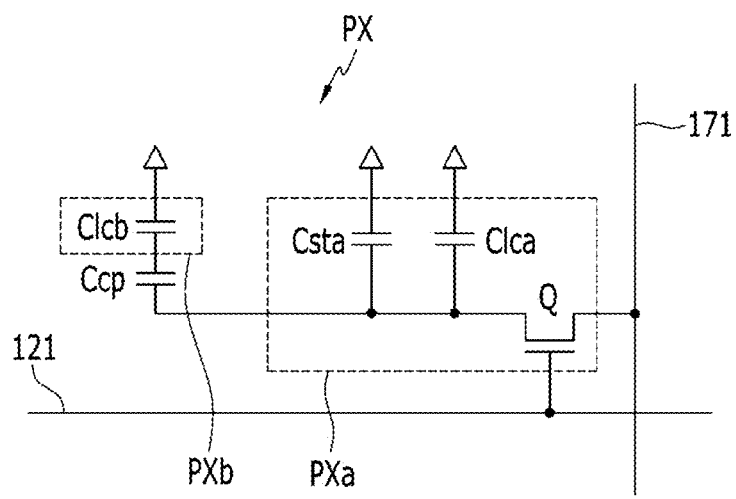

FIGS. 15, 16, and 17 are respectively equivalent circuit diagrams of one pixel of an LCD according to exemplary embodiments of the invention, illustrating various circuit structures of one pixel PX including the first subpixel PXa and the second subpixel PXb.

Referring to FIG. 15, the LCD according to the exemplary embodiment of the invention includes first and second data lines 171a and 171b, a signal line including the gate line 121, and the pixel PX connected thereto.

Each pixel includes first and second subpixels PXa and PXb. The first subpixel PXa of each pixel PX includes a first switching element Qa, a first liquid crystal capacitor Clca, and a first storage capacitor Csta, and the second subpixel PXb includes a second switching element Qb, a second liquid crystal capacitor Clcb, and a second storage capacitor Cstb.

The first switching element Qa includes a control terminal connected to the gate line 121 and an input terminal connected to the first data line 171a. An output terminal of the first switching element Qa is connected with the first liquid crystal capacitor Clca and the first storage capacitor Csta.

The second switching element Qb includes a control terminal connected to the gate line 121 and an input terminal connected to the second data line 171b. An output terminal of the second switching element Qb is connected with the second liquid crystal capacitor Clcb and the second storage capacitor Cstb.

The first liquid crystal capacitor Clca and the second liquid crystal capacitor Clcb may receive different data voltages for one input image signal through the first and second switching elements Qa and Qb which are connected to different data lines 171a and 171b, respectively.

Next, referring to FIG. 16, the display device according to the exemplary embodiment includes signal lines including a data line 171 and first and second gate lines 121a and 121b, and pixels PX connected thereto. Each pixel PX includes first and second subpixels PXa and PXb.

The first switching element Qa included in the first subpixel PXa includes a control terminal connected to the first gate line 121a and an input terminal connected to the data line 171. An output terminal of the first switching element Qa is connected with the first liquid crystal capacitor Clca and the first storage capacitor Csta.

The second switching element Qb includes a control terminal connected to the second gate line 121b and an input terminal connected to the data line 171. An output terminal of the second switching element Qb is connected with the second liquid crystal capacitor Clcb and the second storage capacitor Cstb.

The first liquid crystal capacitor Clca and the second liquid crystal capacitor Clcb may receive different data voltages for one input image signal which is transferred by the data line 171 at different times through the first and second switching elements Qa and Qb which are connected to different gate lines 121a and 121b, respectively.

Next, referring to FIG. 17, the display device according to the exemplary embodiment includes signal lines including a data line 171 and a gate line 121, and pixels PX connected thereto. Each pixel PX may include first and second subpixels Pxa and PXb, and a coupling capacitor Ccp which is connected between the two subpixels PXa and PXb.

The first subpixel Pxa includes a switching element Q connected to the gate line 121 and the data line 171, and a first liquid crystal capacitor Clca and a first storage capacitor Csta which are connected thereto, and the second subpixel PXb includes a second liquid crystal capacitor Clcb connected with the coupling capacitor Ccp.

A control terminal of the switching element Q is connected with the gate line 121, an input terminal is connected with the data line 171, and an output terminal is connected with the first liquid crystal capacitor Clca, the first storage capacitor Csta, and the coupling capacitor Ccp. The switching element Q transfers a data voltage of the data line 171 to the first liquid crystal capacitor Clca and the coupling capacitor Ccp according to a gate signal from the gate line 121, and the coupling capacitor Ccp may transfer the data voltage of which a magnitude is changed to the second liquid crystal capacitor Clcb. A charged voltage of the second liquid crystal capacitor Clcb may always be smaller than a charged voltage of the first liquid crystal capacitor Clca because of the coupling capacitor Ccp. When the capacitance of the coupling capacitor Ccp is appropriately controlled, a ratio of the charging voltage Va of the first liquid crystal capacitor Clca and the charging voltage Vb of the second liquid crystal capacitor Clcb is controlled, thereby improving the lateral visibility.

In the LCD according to the exemplary embodiments, the first subpixel electrode and the second subpixel electrode providing one terminal of the first liquid crystal capacitor Clca and the second liquid crystal capacitor Clcb included in the pixel PX may have the same shape and function as the lower electrode 191 according to the previous exemplary embodiments, and the upper electrode 270 of each of the subpixels PXa and PXb may also have the same shape and function as the upper electrode 270 according to the previous exemplary embodiments.

Figure 18:
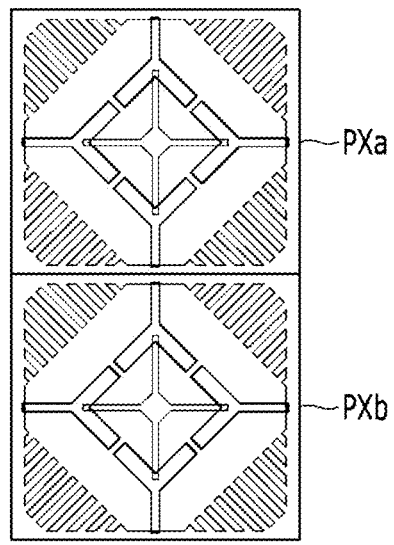
FIGS. 18 to 24 are respective top plan views of exemplary embodiments of a unit electrode of an LCD according to the invention.
Figure 19:
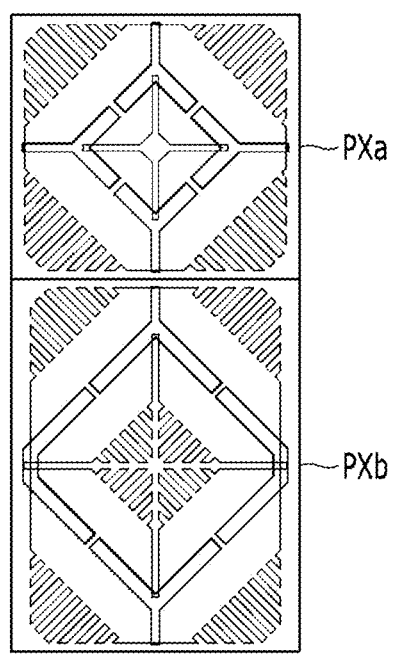
Figure 20:
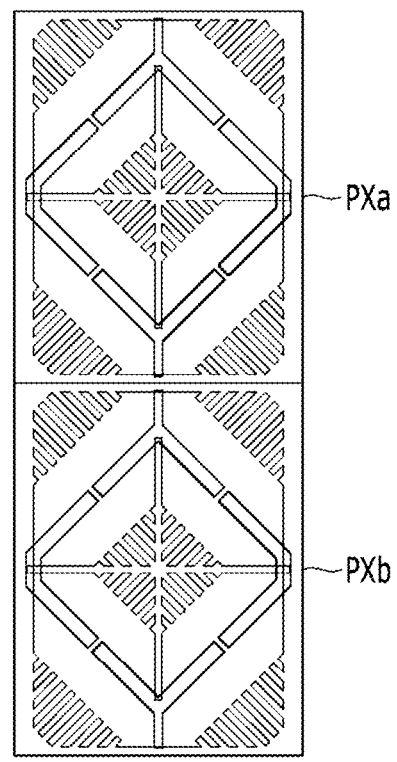
Figure 21:
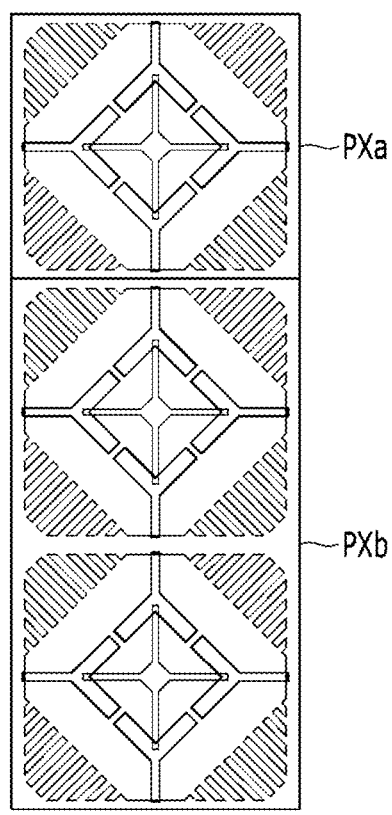
Figure 22:
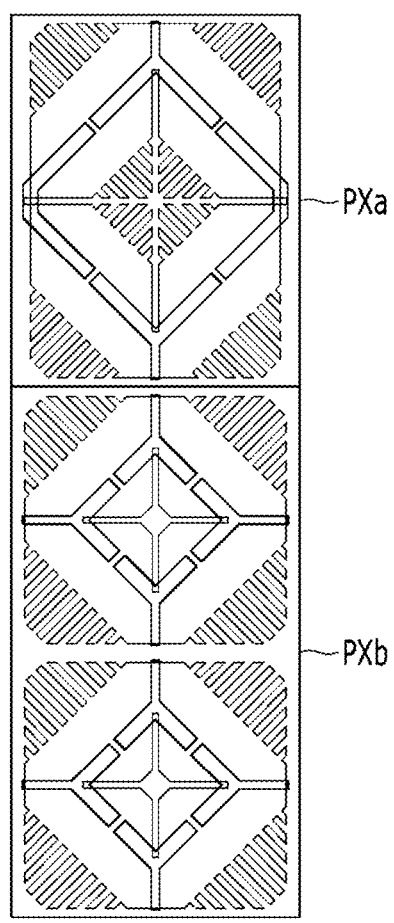
Figure 23:
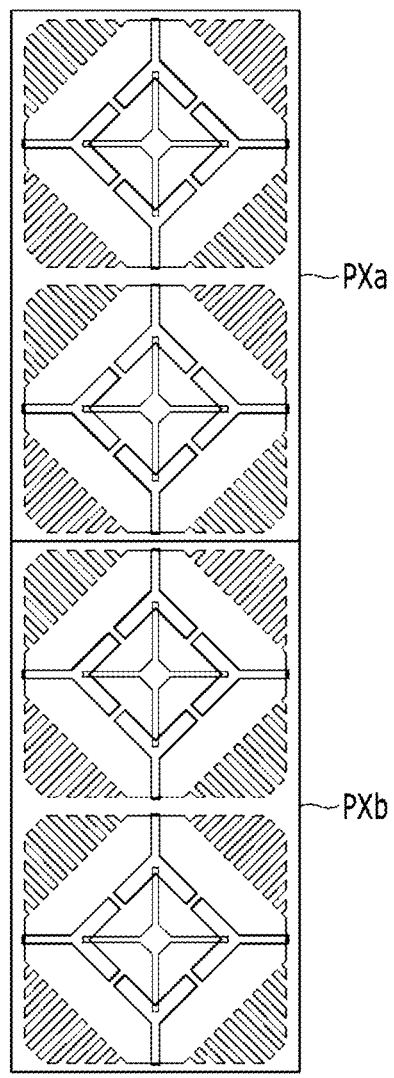
Figure 24:
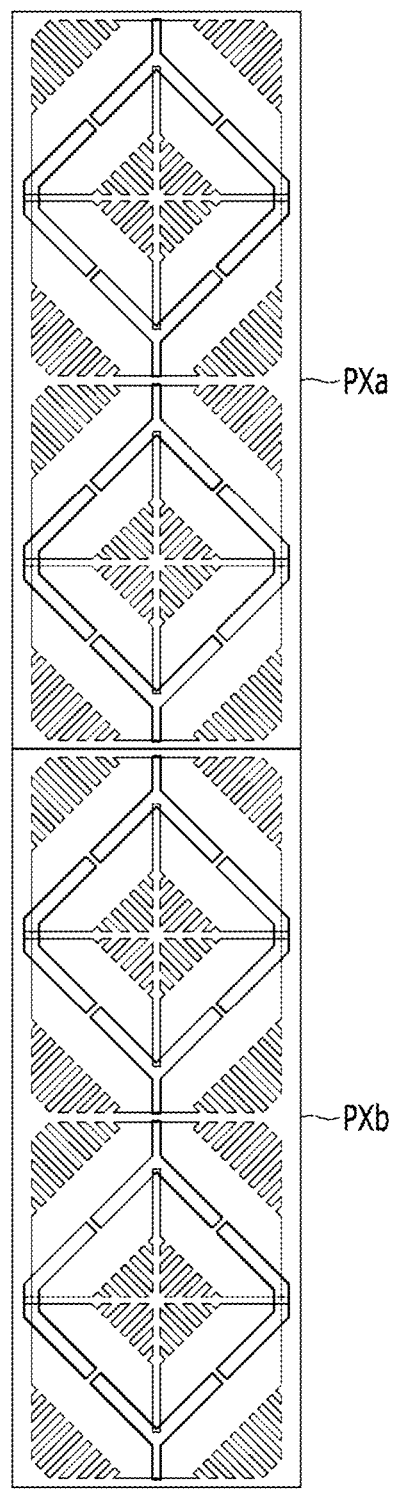

Next, an LCD according to an exemplary embodiment of the invention that has improved lateral visibility will be described with reference to FIGS. 18 and 24 as well as FIGS. 12 to 17.

FIGS. 18 to 24 are respectively top plan views of a unit electrode of an LCD according to exemplary embodiments of the invention.

One pixel PX of the LCD according to an exemplary embodiment of the invention includes the first subpixel PXa and the second subpixel PXb according to the previous exemplary embodiments, and the luminance of the first subpixel PXa is higher than or equal to the luminance of the second subpixel PXb. Unit electrodes of the first subpixel PXa and the second subpixel PXb may have a unit electrode structure according to various exemplary embodiments.

Further, in an exemplary embodiment, the number of at least one unit electrode included in the second subpixel PXb may be equal to or greater than that of at least one unit electrode included in the first electrode PXa. In an exemplary embodiment, in the LCD shown in FIGS. 18 to 20, 23 and 24, the number of at least one unit electrode included in the second subpixel PXb is equal to that of at least one unit electrode included in the first electrode PXa. In the LCD shown in FIGS. 21 and 22, the number of at least one unit electrode included in the second subpixel PXb is greater than that of at least one unit electrode included in the first electrode PXa.

Further, in an exemplary embodiment, the unit electrodes of the first subpixel PXa and the second subpixel PXb may be provided to have the same area or different areas.

In the case that the unit electrodes of the first subpixel PXa and the second subpixel PXb are provided to have the same area, all of the central minute cutouts 197*d* (refer to FIG. 11) may be defined in each of the lower unit electrodes 191 or the central minute cutouts 197*d* may not be defined in each of the lower unit electrodes 191. In an exemplary embodiment, in the LCD shown in FIGS. 18, 21 and 23, the unit electrodes of the first subpixel PXa and the second subpixel PXb are provided to have the same area. In this case, none of the lower unit electrodes 191 include the central minute cutouts 197*d*. Further, in the LCD shown in FIGS. 20 and 24, the unit electrodes of the first subpixel PXa and the second subpixel PXb are provided to have the same area. In this case, all of the central minute cutouts 197*d* may be defined in each of the lower unit electrodes 191.

In contrast, in the case that the unit electrodes of the first subpixel PXa and the second subpixel PXb is provided to have different areas, the central minute cutouts 197*d* are defined in the lower unit electrode 191 having a relatively large area, while the central minute cutouts 197*d* are not defined in the lower unit electrode 191 having a relatively small area. In an exemplary embodiment, in the LCD shown in FIG. 19, the area of the unit electrode included in the second subpixel PXb is larger than that of the unit electrode included in the first subpixel PXa. In this case, the lower unit electrode 191 included in the second subpixel PXb includes the central minute cutouts 197*d*, while the lower unit electrode 191 included in the first subpixel PXa does not include the central minute cutouts 197*d*. Similarly, in the LCD shown in FIG. 22, the area of the unit electrode included in the first subpixel PXa is larger than that of the unit electrode included in the second subpixel PXb. In this case, the lower unit electrode 191 included in the first subpixel PXa includes the central minute cutouts 197*d*, while the lower unit electrode 191 included in the second subpixel PXb does not include the central minute cutouts 197*d*.

As such, the LCD according to the exemplary embodiment may further improve side visibility by including the central minute cutouts in the lower unit electrode according to the area of the subpixel.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a lower panel electrode including at least one lower panel unit electrode;
an upper panel electrode including at least one upper panel unit electrode facing the at least one lower panel unit electrode; and
a liquid crystal layer disposed between the lower panel electrode and the upper panel electrode and including a plurality of liquid crystal molecules aligned approximately perpendicular to surfaces of the lower panel electrode and the upper panel electrode,
wherein the at least one lower panel unit electrode includes a center electrode disposed at a center thereof and having an n-polygonal shape, a plurality of minute branches which extends from each side of the n-polygonal shape of the center electrode to an outside, and n is greater than 5, and
wherein the lower panel unit electrode comprises a first cutout disposed in a center of the center electrode and including a central cutout disposed in a center of a cross-shaped cutout, and
wherein the upper panel unit electrode comprises a second cutout disposed between the plurality of minute branches and the first cutout and a third cutout connected to the second cutout, and
wherein the cross-shaped cutout and the third cutout extend in the same direction.

2. The liquid crystal display of claim 1,
wherein the center electrode has an n-polygonal shape, and n is 8, and
a plurality of minute branches which extends from four sides of the n-polygonal shape of the center electrode to an outside, and the other sides of the n-polygonal shape of the center electrode are not connected to the plurality of minute branches.

3. The liquid crystal display of claim 2, wherein the lower panel unit electrode comprises a first cutout disposed in a center of the center electrode and including a central cutout disposed in a center of the cross-shaped cutout.

4. The liquid crystal display of claim 3, wherein the central cutout has a polygonal shape including linear sides which are respectively disposed at the plurality of subregions and a vertex connected to the cross-shaped cutout.

5. The liquid crystal display of claim 2, wherein the plurality of minute branches extends in different directions at different subregions of the plurality of subregions.

6. The liquid crystal display of claim 2, wherein a maximum length of the plurality of minute branches is about 30 micrometers.

7. The liquid crystal display of claim 2, wherein the first cutout further includes a central minute cutout which extends from the cross-shaped cutout and the central cutout.

8. The liquid crystal display of claim 7, wherein the central minute cutout extends in different directions at different subregions of the plurality of subregions.

9. The liquid crystal display of claim 8, wherein one pixel includes first and second subpixels which display equal or different luminance for one input image signal, each of the first subpixel and the second subpixel includes unit electrodes including the lower panel electrode and the upper panel electrode, and the number of said at least one unit electrode included in the second subpixel is equal to or greater than that of said at least one unit electrode included in the first subpixel.

10. The liquid crystal display of claim 9, wherein the unit electrodes included in the first subpixel and the second subpixel have different areas, and the at least one lower panel unit electrode having a large area in which central minute cutouts are defined.

11. The liquid crystal display of claim 9, wherein the unit electrodes included in the first subpixel and the second subpixel have the same area, and central minute cutouts are defined in each of the at least one lower panel unit electrodes.

12. The liquid crystal display of claim 9, wherein the unit electrodes included in the first subpixel and the second subpixel have the same area, and central minute cutouts are not defined in each of the at least one lower panel unit electrodes.

13. The liquid crystal display of claim 1, wherein a distance between the central cutout and the second cutout is in a range of about 15 micrometers to about 30 micrometers.

14. The liquid crystal display of claim 1, wherein a distance between the second cutout and the plurality of minute branches is in a range of about 15 micrometers to about 30 micrometers.

15. The liquid crystal display of claim 1, wherein the second cutout is defined to have a polygonal shape including linear cutouts which are respectively defined in the plurality of subregions and a vertex connected to the third cutout.

16. The liquid crystal display of claim 15, wherein the second cutout surrounds the first cutout.

17. The liquid crystal display of claim 16, wherein the first cutout includes a plurality of first cutouts which is partially overlapped with each other at a vertex of the second cutout.

18. The liquid crystal display of claim 1, wherein each of the plurality of subregions includes a first section surrounded by the first cutout and the second cutout, a second section surrounded by the second cutout and the minute branches, and a third section includes the minute branches.

19. The liquid crystal display of claim 18, wherein the second cutout further includes a pattern which connects the first section to the second section.

20. The liquid crystal display of claim 19, wherein a width of the pattern is smaller than that of the second cutout.

21. The liquid crystal display of claim 19, wherein the pattern includes at least one pattern defined in the second cutout which is defined in each of the plurality of subregions.

* * * * *